United States Patent Office 2,707,678
Patented May 3, 1955

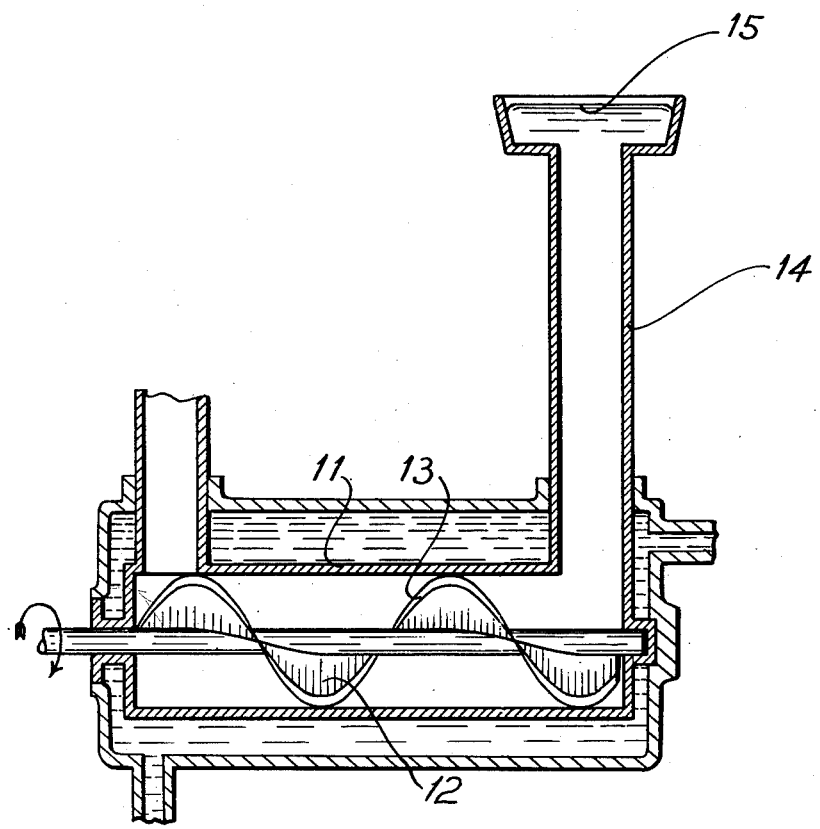

2,707,678

METHOD FOR THE SEPARATION OF ALUMINUM FROM ITS SOLUTION IN HOT MERCURY

Georg Messner, Johannesburg, Transvaal, Union of South Africa, assignor to Inventa A.-G. fuer Forschung und Patentverwertung Luzern, Lucerne, Switzerland Application October 19, 1950, Serial No. 191,091

1 Claim. (Cl. 75—68)

This invention relates to an improved method for the separation of aluminum from its solution in hot mercury.

It is known that in certain cases pure aluminum may be obtained from aluminum alloys by treating the aluminum alloys with hot mercury, thereby dissolving the aluminum in the hot mercury.

This hot solution is separated from the undissolved part of the alloy. The aluminum is precipitated by cooling the mercury, and the aluminum now present in solid form (amalgam) is cleaned of adhering mercury partly mechanically and partly by heating, so that the pure aluminum remains.

It has been suggested in the prior art to carry out the separation in a vertical tube in which the rising aluminum solution can cool off in mercury.

The precipitated solid aluminum, having a lower specific gravity than the mercury is supposed to rise in the vertical tube and collect on the surface of the mercury.

It is developed that this method of separation may be carried out on a very small scale only, but not in large apparatus such as is necessary for technical application. The fact is that after a short working period the vertical tube is soon clogged by precipitated aluminum amalgam which cannot be removed by mechanical means such as poking, scratching etc., becoming instead ever harder and finally precluding all passage through the tube.

It has been found that undisturbed crystallization and removal of the aluminum amalgam can be accomplished without complicated equipment if the crystallization on cooling is made to take place not in a vertical but in a horizontal pipe.

Insofar as the precipitated aluminum adheres to the inside wall of the tube, it can be comparatively easily loosened by a cutting worm and propelled by the movement of the worm to an upward opening at the end of the cooling and crystallizing zone proper through which the aluminum automatically enters a vertical pipe arranged here and floats to the surface of the mercury.

In the following, the invention is illustrated by way of example with reference to the accompanying drawing showing an embodiment of the apparatus for carrying the process into effect, the apparatus being shown in longitudinal section.

The solution of aluminum in mercury arising in the extraction vessel flows at a temperature of, for example, 500° C. in a horizontal, pressure-resistant, thick-walled pipe 11 of 120 mm. clear diameter and 3 m. length which is cooled from the outside, partly by air cooling and partly by mercury flowing in a concentric cooling jacket (heat exchanger), to 200° C. at the end. The cooling brings about the precipitation of dissolved aluminum, mainly at the cooled pipe wall. The aluminum adhering to the tube wall is continuously loosened from the wall by means of a rotating worm 12 equipped with cutters 13 and pushed to the end of the crystallization pipe from which a tube 14 of 50 mm. clear diameter goes vertically upward. The solid aluminum pushed forward by the worm enters this vertical tube due to its floating in mercury and rises to the surface 15 of the mercury in the tube, whence it can be easily mechanically removed for further processing.

I claim:

In a process for the continuous separation of aluminum from its solution in mercury, the improvement which comprises flowing the hot solution of aluminum in mercury through a horizontally disposed container, cooling the surface of said container to crystallize aluminum from the solution, loosening said crystallized aluminum from said surface, propelling said loosened crystallized aluminum horizontally through said container, thereafter permitting said loosened crystallized aluminum to rise vertically with respect to the container, and then mechanically separating said crystallized aluminum from the liquid mercury.

References Cited in the file of this patent

UNITED STATES PATENTS

| | | |
|---|---|---|
| 2,090,451 | Kruh | Aug. 17, 1937 |
| 2,091,900 | Widner | Aug. 31, 1937 |
| 2,261,406 | Orme | Nov. 4, 1941 |
| 2,548,895 | Graham et al. | Apr. 17, 1951 |

OTHER REFERENCES

Metal Industry, September 16, 1949, page 233.

Chemical Abstracts, volume 43, October 25, 1949, page 7880.

Metall Wirtschaft-Wissenschaft Technik, vol. 3, January 1949, pages 1–15.